United States Patent [19]

Mathews

[11] 4,417,248

[45] Nov. 22, 1983

[54] ADAPTIVE COLLISION THREAT ASSESSOR

[75] Inventor: Bruce D. Mathews, Arnold, Md.

[73] Assignee: Westinghouse Electric Corp., Pittsburgh, Pa.

[21] Appl. No.: 279,497

[22] Filed: Jun. 30, 1981

[51] Int. Cl.³ ............................................. G01S 13/00
[52] U.S. Cl. ................................. 343/16 M; 343/455; 364/461
[58] Field of Search ................ 343/16 M, 11 R, 18 E, 343/112 CA, 7 A; 364/423, 443, 447, 456, 460, 461, 462

[56] References Cited

U.S. PATENT DOCUMENTS 3,040,314  6/1962  Hesse ....................... 343/112 CA X
3,787,845  1/1974  Kubota et al. ........... 343/112 CA X
4,146,892  3/1979  Overman et al. ................ 343/18 E Primary Examiner—Maynard R. Wilbur
Assistant Examiner—Robert C. Burk
Attorney, Agent, or Firm—W. E. Zitelli

[57] ABSTRACT

In a monopulse radar, a system is included to adaptively assess a detected threat in accordance with the relative bearing representative measurements thereof to determine the collision potential of the threat with the radar. The monopulse radar is operative to detect at least one potential threat and to track the threat through a sequence of time increments beginning with the detection thereof. For each time increment, a signal representative of the relative bearing of the detected threat is derived, forming a sequence of relative bearing representative signals respectively corresponding to the sequence of time increments. From the derived relative bearing signals, the assessor system forms, at each of a selected number of increments, a signal representative of an adaptively updated initial approach bearing measurement of the detected threat with respect to the radar, a signal representative of an adaptively filtered estimate of an instantaneous relative bearing measurement of the detected threat with respect to the radar, and a signal representative of the level of confidence of the generated instantaneous relative bearing measurement signals. A comparison test is conducted at each of the selected number of time increments for detecting a deviation between correspondingly generated initial approach and instantaneous relative bearing measurement signals which is greater than the corresponding level of confidence signal, the event being indicative of a non-collision bearing behavior of the detected threat.

9 Claims, 13 Drawing Figures

ADAPTIVE COLLISION THREAT ASSESSOR

GOVERNMENT CONTRACT CLAUSE

The Government has rights in this invention pursuant to Contract No. F33657-75-C-0645 awarded by the Department of the Air Force.

BACKGROUND OF THE INVENTION

The present invention is directed to threat detecting and tracking radars, in general, and more particularly, to a system of the radar which adaptively assesses a detected threat in accordance with derived relative bearing representative measurements thereof to determine the collision potential of the threat with the radar.

Many modern airborne radars include a system to detect potential threats, like a seeking missile, for example. To avoid collision with the detected threat, these airborne radar systems alert the pilot when the potential threat comes within a given proximity range of the aircraft such that sufficient time is allowed for the pilot to dispense some type of counter measure. In general, these radar systems are designed in accordance with a failsafe philosophy which allows for false alarms, but does not permit a potential threat to go undetected. That is, all detected targets are considered as real threats unless they can be discriminated otherwise with a definite degree of certainty. Needless to say, a strict failsafe criteria with regard to threat detection causes a large number of false assessments which correspondingly result in an equal number of false dispensing of the countermeasure media. Since each countermeasure dispense is in itself a very expensive reaction, it becomes apparent that large numbers of false identification produce very high life cycle costs in operating these radar systems.

To reduce the number of false assessments, some radar systems rely upon special techniques to assess the various threat potentials in order to discriminate between false and real threats. The majority of tests are designed to discriminate between aircraft and seeking missiles and generally rely upon target radar signature and range-velocity characteristics as well as range proximity. One known discrimination technique utilizes an accurate radar cross-section derivation of the potential threat for an assessment. This test remains viable as long as the radar reflections from the potential threat fall within the main beam of the radar. However, because of the gain characteristics of the radar beam, when the radar reflections are received elsewhere, like on the edges of the radar beam, for example, the received signals may be attenuated as a result of the gain characteristics of the beam, thus reducing the apparent cross-sectional size of the target being assessed, making an aircraft target, for example, appear more in the shape of a missile or the like. Consequently, the potential threat may be assessed as a real threat causing a false countermeasure dispense to be activated needlessly.

Some radar systems employ additional tests to assist in the discrimination process to further clarify target identification. One of these tests relies on the drag characteristics of the missile in its collision course with the aircraft, that is, a missile tends to decelerate upon approaching the aircraft. Therefore, the combination of cross-section and deceleration calculation values of the potential threat is expected to provide a more accurate discrimination of the false threat and, indeed, this appears to be the case in many instances. However, there still remains certain flight conditions of the potential threat under which this combination of tests may not discriminate against aircraft false targets.

In this regard, suppose that a potential threat, which is an aircraft, for example, is detected along the side of the main beam of the radar antenna at a time when the aircraft is deviating from a collision course with the homecraft. As the aircraft deviates, it may decelerate. In this scenario, the radar computes an apparent cross-sectional signature of a missile which is decelerating, the combination rendering a positive indentification of a real threat even though in reality an aircraft avoiding collision is actually present.

For the most part, target cross-section radar signature, range-velocity characteristics and proximity tests in combination offer a viable and fairly accurate discrimination of aircraft targets from missile targets under fail-safe requirements. However, there are certain conditions or combinations of conditions under which the threat discrimination breaks down, resulting in a false dispensing of countermeasure media unnecessarily. To reduce further the life cycle operational costs of these threat detection radars, the present invention provides for a system offering still another discrimination test which may be used individually or in combination with the others to reduce the number of false identifications and thus reduce the life cycle cost of operating the radar system making it more economically attrative.

SUMMARY OF THE INVENTION

In a monopulse radar which is operative to detect at least one potential threat and to track such threat through a sequence of time increments beginning with the detection thereof, there is included a system for assessing the detected threat adaptively in accordance with the relative bearing thereof with respect to the radar to determine the collision potential thereof with the radar. The system includes a means for deriving a signal representative of the relative bearing of the at least one detected threat for each time increment to generate a sequence of relative bearing representative signals respectively corresponding to the sequence of time increments. For each of a selected number of time increments, means are provided for generating: a first signal based on a signal weighting function of the relative bearing representative signals derived for the sequence of time increments from threat detection to the corresponding selected time increment, inclusively; a second signal based on a signal weighting function of a predetermined number of most recently derived relative bearing representative signals with respect to the corresponding time increment; and a third signal based on a function representative of the fluctuations in the relative bearing representative signals generated for this sequence of time increments from threat detection to the corresponding selected time increment, inclusively. At each of the selected number of time increments, the deviation between the correspondingly generated first and second signals is compared with the correspondingly generated third signal to determine the collision potential of the detected threat with the radar.

Preferably, the first signal is generated by accumulating the relative bearing representative signals derived for the sequence of time increments associated with each generated first signal to form a long term, signal weighted mean signal for each of the selected time increments. This long term mean signal is representative of an adaptively updated initial approach bearing measurement of the detected threat with respect to the radar. In addition, the second signal may be generated by accumulating the predetermined number of most recently derived relative bearing representative signals associated with each generated second signal to form a short term, signal weighted mean signal for each of the related time increments. This short term mean signal is representative of an adaptively filtered estimate of an instantaneous relative bearing measurement of the detected threat with respect to the radar. Still further, the third signal may be generated in an arithmetic processing means which derives a standard deviation signal from the generated second signals and correspondingly derived relative bearing representative signals for each of the selected time increments. The signal formed is representative of the level of confidence of the generated signals for each of the selected time increments. In the comparison tests, when the deviation between the corresponding first and second signals becomes greater than the value of the correspondingly third signal, a signal representative of a non-collision bearing behavior of the detected threat is generated.

DESCRIPTION OF THE PREFERRED EMBODIMENT

The present invention relies on the basic principle that detected potential threats on a collision course with the homecraft of the radar will maintain constant relative bearing with respect to the homecraft. Therefore, relative bearing information of the detected potential threat may be utilized to assess the trajectory thereof with regard to discriminating a real threat, such as a seeking missile, for example, which is expected to maintain a collision course with the homecraft, from an aircraft which is expected to deviate from a collision course as it nears the homecraft. When the relative bearing assessment is used in conjuction with range proximity thresholds, it may prevent a detected threat, determined to be on a non-collision course from activating a countermeasure dispense.

Figure 1:
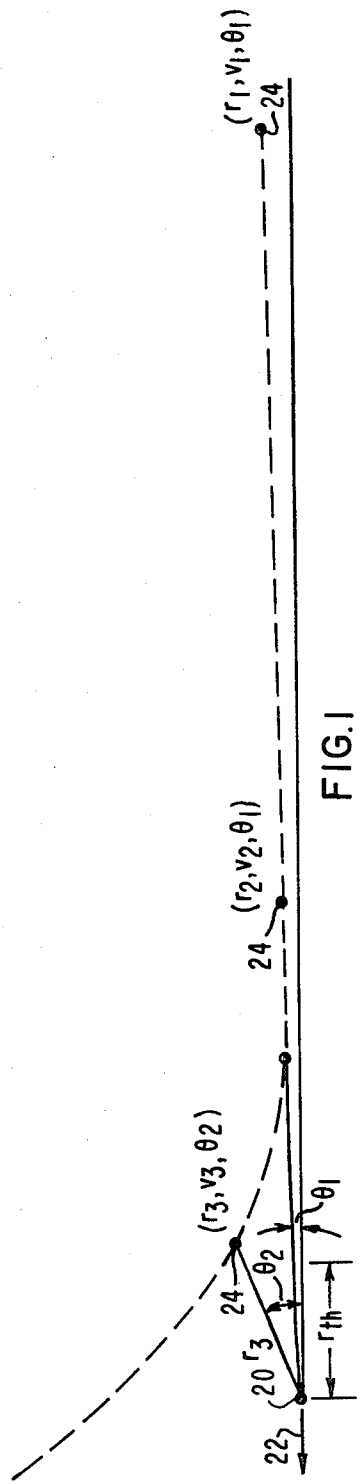
FIG. 1 depicts a typical scenario of a homecraft with an onboard radar and a potential threat for illustrating the basic principles of the present invention.

A typical scenario of this principle is illustratively depicted in FIG. 1. Assume that the dot 20 is the homecraft which has an onboard radar (not shown) for detecting potential threats. In the present example, the craft 20 has the bearing depicted by the arrow 22. Assume also that a potential threat target depicted by the dot 24, is detected at the first time increment $t_1$ at a range $r_1$ with a velocity $V_1$ and relative bearing $\theta_1$ with respect to the homecraft 20. At the range $r_1$, which is considered very far from homecraft 20 in the present example, the detected threat 24 appears initially on a collision course with the homecraft 20. At another subsequent selected time increment $t_2$, the target has not deviated from its bearing $\theta_1$ but is recognized as being closer in range $r_2$ with a different velocity $v_2$. As long as the detected threat 24 continues on the same constant relative bearing $\theta_1$, it will continue to be classified as a real threat. Accordingly, as a result of the detected threat 24 crossing the proximity range threshold denoted at $r_{th}$, with the same relative bearing $\theta_1$, the radar system on board the homecraft 20 will dispense countermeasure media to confuse the threat and avoid being shot down.

However, in the scenario depicted in FIG. 1, at a subsequent time increment $t_3$, should the radar system of the craft 20 identify that the potential threat 24 has deviated to a new relative bearing $\theta_2$ at a range $r_3$ prior to the proximity threshold range $r_{th}$, it may discriminate the potential threat 24 as an aircraft on a non-collision course with the homecraft 20 thereby avoiding an unnecessary countermeasure dispense.

It may be worth noting that for slowly maneuvering targets the relative bearing angle $\theta_i$ with respect to the radar of the homecraft 20 varies as a function of the miss distance between the detected potential threat 24 and the homecraft 20. For example, for those detected threats having a large miss distance, the relative bearing angle thereof with respect to the homecraft will change rapidly at ranges approaching the point of closest approach. Conversely, with a much smaller miss distance between craft, the relative bearing angle changes much more slowly. In either event, the change in the relative bearing angle from the initial relative bearing angle beyond uncertainty or confidence limits may be used for false threat discrimination purposes.

Figure 2:
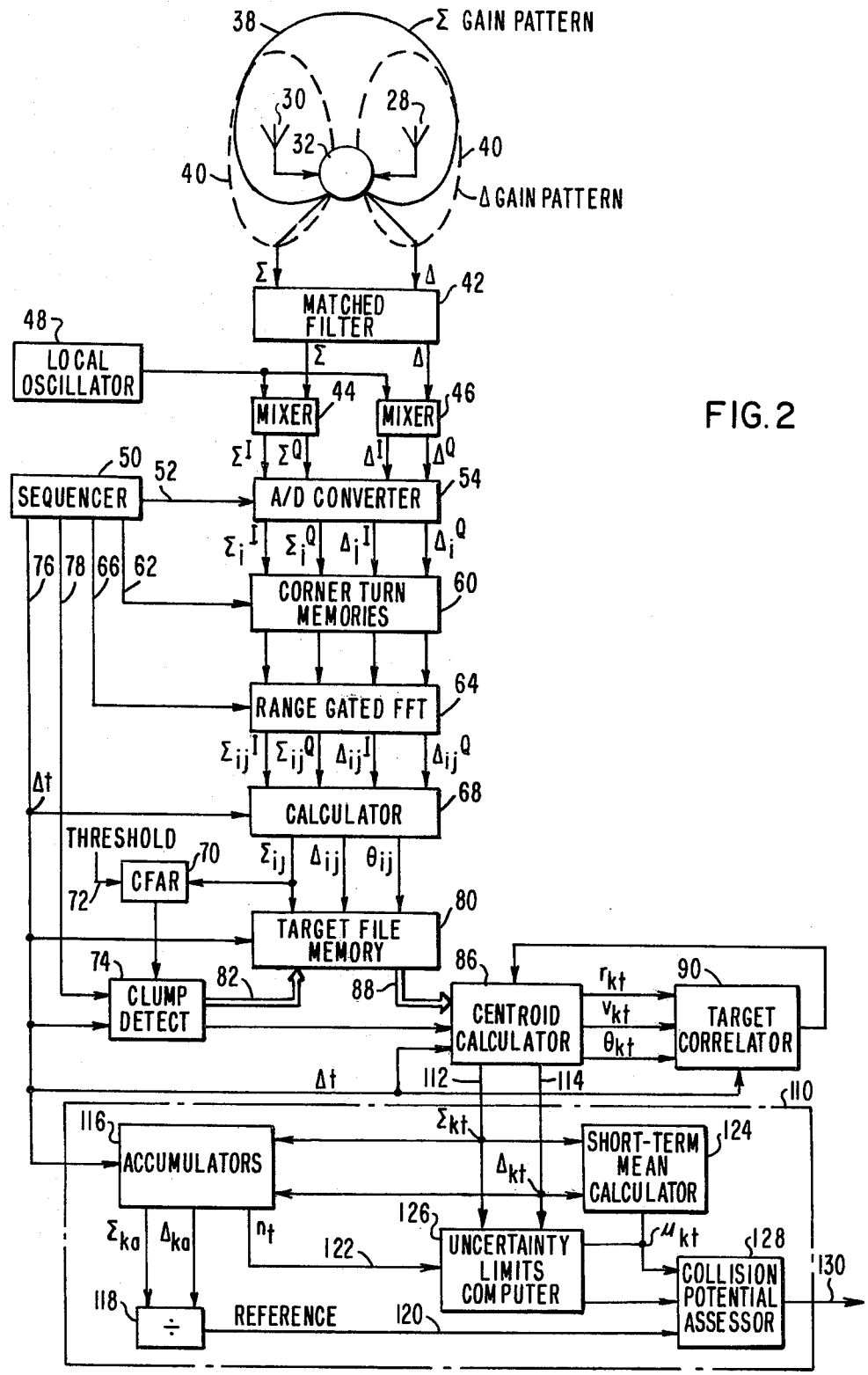
FIG. 2 is a functional block diagram schematic of a typical monopulse radar suitable for embodying the principles of the present invention.

A typical monopulse radar suitable for embodying the principles of the present invention is shown in the functional block schematic of FIG. 2. A simple one dimensional monopulse radar embodiment representing either azimuth or elevational measurements will be used for the purposes of describing the principles of the present invention. However, it is understood that the invention would more than likely use both azimuth and elevation measurements in actual performance. In FIG. 2, the monopulse radar antenna is represented by the dual antenna elements 28 and 30 which feed into a microwave hybrid assembly 32 for processing the antenna signals into sum $\Sigma$ and difference $\Delta$ channels. Typical antenna gain patterns for the sum $\Sigma$ and difference $\Delta$ signals are shown by the solid line 38 and dashed lines 40, respectively.

Generally, the $\Sigma$ and $\Delta$ signals are preprocessed by a conventional matched filter 42 prior to being passed along to a set of mixer stages 44 and 46. In combination with a conventional local oscillator 48, the mixers 44 and 46 may provide in-phase and quadrature components of each of the $\Sigma$ and $\Delta$ signals. In a synchronous radar post-processor, a conventional sequencer unit 50 may be used to synchronize the various post-detection processing operations performed therein. For example, the $\Sigma$ and $\Delta$ signals, in the form of in-phase and quadrature components, may be sampled in accordance with a timing signal 52 provided by the sequencer 50 and digitized by set of conventional A/D converters 54. The sampling times of the A/D conversions normally correspond to various predetermined range gates which divide up the interpulse period of the pulsed radar transmissions.

Figure 3:
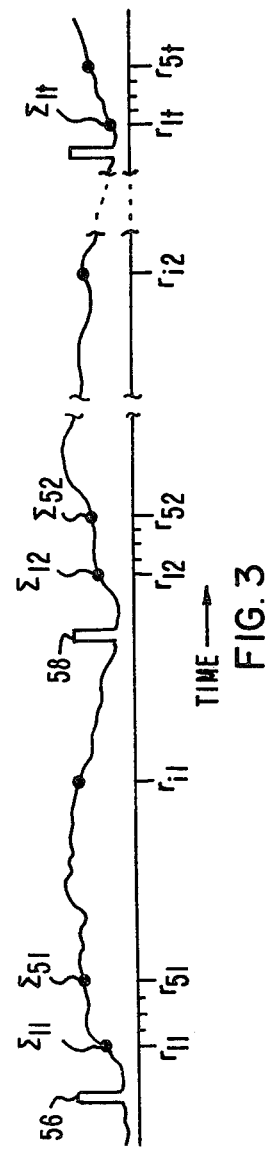
FIG. 3 is an illustration of received signal waveforms between pulsed transmissions for either the sum or difference channels of a monopulse radar.

FIG. 3 illustrates a received signal waveform between pulsed transmissions for either the $\Sigma$ and $\Delta$ channels. Referring to FIG. 3, the interpulse period between the pulsed transmissions 56 and 58 may be divided up into range gates consisting of $r_{11}, \ldots, r_{51}, \ldots, r_{i1}, \ldots$ and likewise, the successive interpulse period may be divided up into corresponding range gates $r_{12}, \ldots, r_{52}, \ldots, r_{i2}, \ldots$. The second numerical value in the subscript of the range gate denotes the interpulse period at which the received information is being sampled. For example, a signal in the $\Sigma$ channel being sampled for range gate 1 in interpulse period 1 may be denoted as $\Sigma_{11}$ and the signal in the $\Sigma$ channel for range gate 1 in the next consecutive interpulse period t may be denoted as $\Sigma_{12}$ and so on. Accordingly, the $\Sigma$ signal for the first range gate in the interpulse period t may be denoted as $\Sigma_{1t}$. It is understood that this type of sampling may be applied to all of the various components for both the sum and difference signals in the A/D converter 54, for example.

Figure 4:
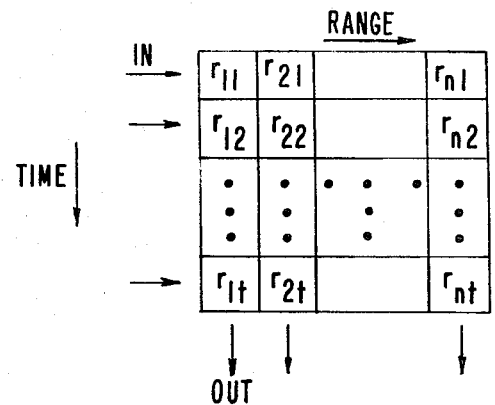
FIG. 4 is a diagram example of the cellular structure of a conventional corner turn memory used in connection with processing range gated data in a monopulse radar.

Usually, the digitized information exiting the A/D converter 54 is provided to a conventional corner turn memory 60 and stored in appropriately indexed memory cells thereof. An example of a corner turn memory and the way in which information is stored therein in accordance with range gate sampling in successive interpulse periods is shown in the diagram of FIG. 4. Referring to FIG. 4, the sampled signal information in accordance with the range gates of one interpulse period may be entered into appropriately addressed cells along one axis of the memory. For example, if the memory is looked at as having cells arranged in rows and columns, all of the range gate information of a received signal or component thereof belonging to one interpulse period may be entered into a row with each column index corresponding to the sampled range gate. Thus, one may look at the column information from row to row as being the time varying change of a received signal or component thereof in the same range gate. In a typical operation then, the sequencer 50 or an equivalent device which is keeping track of the sampling of information may be used to address the corner turn memories 60 synchronously therewith utilizing a set of address lines 62 for example to enter and store the $\Sigma$ and $\Delta$ signal information or components thereof in accordance with the diagram of FIG. 4.

Figure 5:
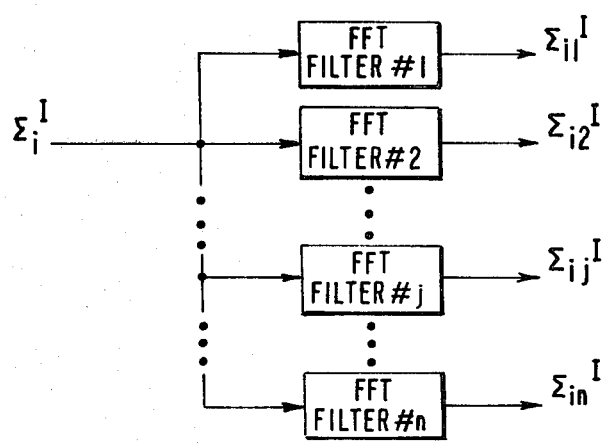
FIG. 5 is a simplified functional block diagram of a fast fourier transform processor suitable for use in describing the post processing operations of a monopulse radar.

The corner turn memory 60 normally accumulates enough information to constitute what is referred to in radar technology as a "look" which may comprise the information in as many as 60 or more interpulse periods, for example. Once the memory 60 is filled, the sequencer 50 may retrieve the signal information therefrom in accordance with a column output much as shown in the diagram of FIG. 4. The sequencer 50 may utilize a sequence of addresses over signal line 62 for these purposes. The time varying information for each range gate retrieved from the memory 60 may be input to a conventional range gated Fast Fourier Transform (FFT) processor 64 which may be time operated by the same sequencer 50 utilizing the timing signals over lines 66, (refer to FIG. 2). A simple functional block diagram of a typical FFT processor is shown in FIG. 5. If, for example, the inphase component of the $\Sigma$ signal for range gate i for one look is sequentially gated into a set of FFT filters #1, #2 . . . , #n, a quantized spectrum of velocity related signals may be effected. The quantized velocity component of each range gated signal $\Sigma_i$ may be denoted, as shown in FIG. 5, by the addition of a second numerical index in the subscript thereof $\Sigma_{ij}$.

In the present embodiment, a calculator circuit 68 may accumulate the range-velocity information of the $\Sigma$ and $\Delta$ signals output from the FFT processor 64 over a large number of looks, say on the order of 80, for example, and may compute, for each aforementioned set of looks, signals representative of the amplitude of the $\Sigma$ and $\Delta$ signals and a signal representative of the relative bearing angle $\theta$ for each of the range-velocity indices. It is understood that relative bearing information may be provided by dividing the difference signal amplitude $\Delta_{ij}$ by the corresponding sum signal amplitude $\Sigma_{ij}$; however, the resulting value is a magnitude value and does not provide the quadrant information. For this reason, the formation of the relative bearing angle $\theta_{ij}$ may be desired.

For the present example, the computed sum signal amplitude $\Sigma_{ij}$ is provided to a conventional constant false alarm rate (CFAR) circuit 70 for comparison with a conventionally generated threshold signal 72. Generally, the threshold signal 72 is adaptably adjusted from a history of the sum signal amplitudes $\rho_{ij}$. The CFAR circuit 70 may provide a first indication for signals determined to be greater than the threshold 72 and another indication for signals determined to be below the threshold 72. In the present embodiment, digital signals representative of a 1 and a 0 are used for the one and another indications, respectively. The digital indications from the CFAR circuit 70 may be provided to a clump detect circuit 74 which forms a mapping thereof in accordance with the range-velocity indicies corresponding thereto. A new map may be formed for each set of looks used by the calculator unit 68 in computing the $\Sigma_{ij}$, $\Delta_{ij}$ and relative bearing angle $\theta_{ij}$ signals.

Each mapping and/or set of looks may constitute an increment $\Delta t$ in time. The sequencer 50 may be used to define the time increment $\Delta t$ and provide the timing therefor over signal line 76 to appropriate processing units like the calculator unit 68 and the clump detect unit 74, for example. In addition, the sequencer 50 may provide a sequence of addresses over signal lines 78 to the clump detect unit 74 to govern the map formation processing occurring therein for each time increment. An example of a range-velocity indexed map of digital indications is shown in the diagram of FIG. 6.

Figure 6:
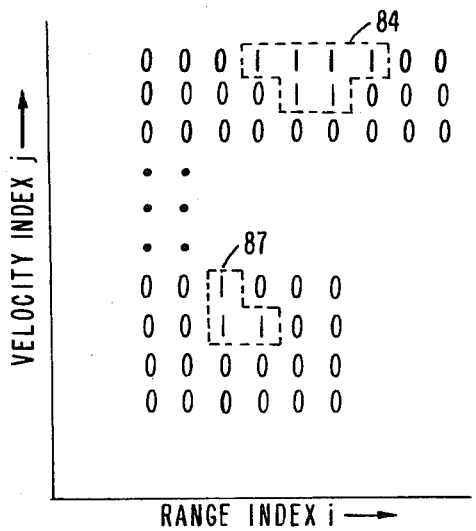
FIG. 6 is a diagram exemplifying a range-velocity indexed map of digital indications for use in describing the operations of the clump detect unit of the embodiment depicted in FIG. 2.

Referring to FIG. 6, the clump indication detect unit 74 may set up a target file in a memory 80 for each of "1" in the map formed therein utilizing the control signals 82. The information stored in the target file for each indexed "1" may be as follows:

$$"1"_{ij} \equiv \{r_i, v_j, \Sigma_{ij}, \Delta_{ij}, \theta_{ij}\}.$$

In addition, the clump detect unit 74 is operative to detect the number of potential threats in each mapping by clumping the groups of adjacently formed digital "1" indications like those shown within the dashed lines 84 and 86, for example, wherein each clump of "1"'s may be assigned a k index and all of the target file information associated with each of the indicies within the clump k may be designated as belonging to the target set $T_k$. The parameters of the target file may include the ranges $r_i$, velocities $V_j$, $\Sigma_{ij}$ and $\Delta_{ij}$ amplitude signals and relative bearing angles $\theta_{ij}$ thereof. This target file information may be accessed from the memory 80 to a centroid calculator 86 over the data lines 88 as controlled by the clump detect unit 74 via control lines 82, for example. The centroid calculator unit 86 may then form centroided values of the parameters in each target clump k as follows:

$$r_k = C(r_i's \text{ in clump } k);$$

$$v_k = C(V_j's \text{ in clump } k);$$

$$\Sigma_k = C(\Sigma_{ij}'s \text{ in clump } k);$$

$$\Delta_k = C(\Delta_{ij}'s \text{ in clump } k); \text{ and}$$

$$\theta_k = C(\theta_{ij}'s \text{ in clump } k);$$

in which case, each target k in the map will have a new target file of controided values, denoted as:

$$T_k \equiv \{r_k, v_k, \theta_k, \Sigma_k, \Delta_k\}.$$

For each time increment t, the set of target files derived for target k in each of the time increments t may be designated as $$T_{kt} \equiv \{r_{kt}, v_{kt}, \theta_{kt}, \Sigma_{kt}, \Delta_{kt}\}.$$

Figure 8:
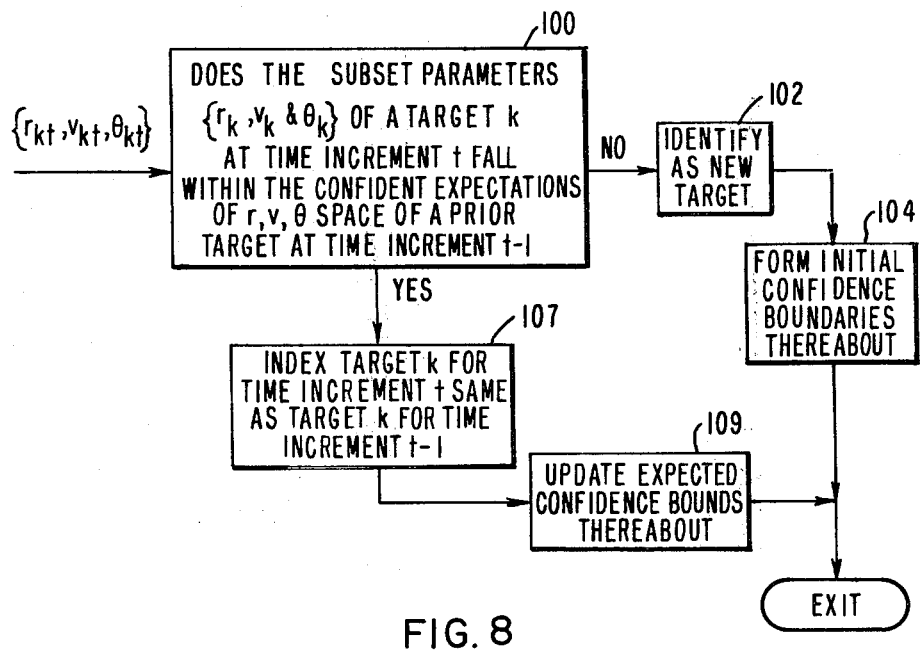
FIG. 8 is an exemplary instructional flowchart used for describing the operations of the target correlator in connection with the illustrative graph of FIG. 7.

The range $r_k$, velocity $v_k$ and relative bearing angle $\theta_k$ for each of the targets k identified in the clump detect unit 74 may be correlated from time increment to time increment in a target correlator unit 90. The correlator 90 may be, for the present embodiment, a programmed processor capable of performing the operations outlined in the flow chart of FIG. 8. The details of the programming in connection with the correlation operations of FIG. 8 are considered well known to those skilled in the pertinent art and in no way are intended to form any part of the present invention. The subset of target file information for each target k including the range $r_k$, velocity $v_k$, and relative bearing angle $\theta_k$ information may be compared from time increment to time increment to determine if the file is being created for a previously identified or a new potential threat.

Figure 7:
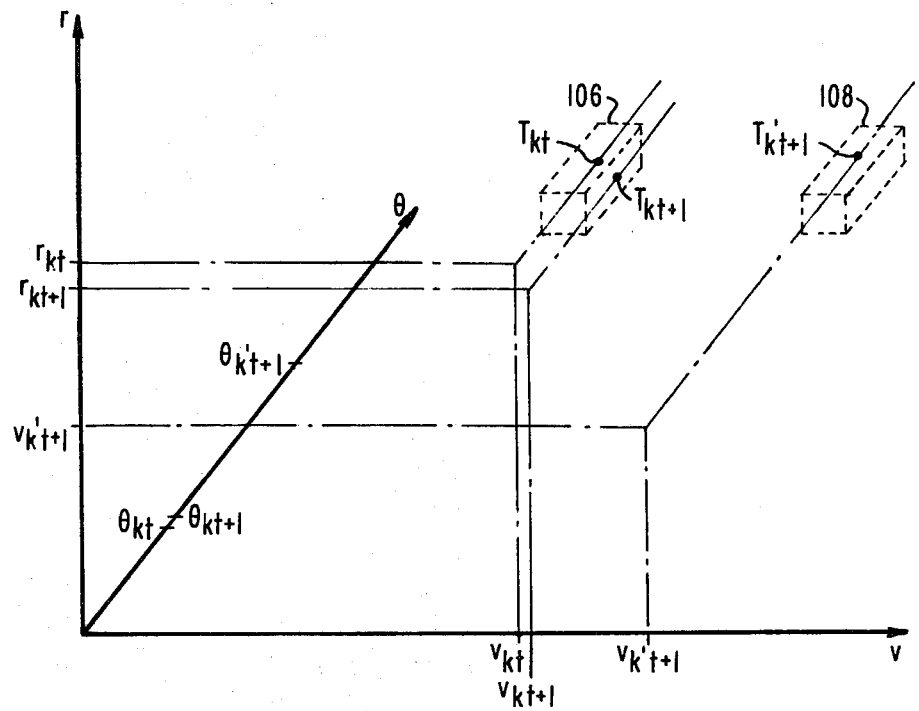
FIG. 7 is a three dimensional graph used for illustrating the tracking operations of the target correlator unit in the embodiment depicted in FIG. 2.

In describing the flow chart of FIG. 8, one may refer to the 3-dimensional exemplary graph of FIG. 7 for an illustrative understanding. Referring to the flow chart of FIG. 8, the initial target file subsets which pass through the decisional block 100 at time t, for example, are identified as new targets and are indexed as such in block 102. Thereafter, initial confidence bounds may be formed about each indexed target in block 104 and the program execution may be exited. Visually, one may think of this process as identifying each target $T_{kt}$ as a dot on a 3-dimensional graph r, v, $\theta$, and forming a region 106 enclosed by dashed lines thereabout which constitute the initial confidence boundaries thereof. At the next time increment t+1, a new target file may be identified and indexed at a point designated as $T_{kt+1}$ on the graph of FIG. 7.

If in the decisional block 100 it is determined the new target file information of target $T_{kt+1}$ falls within the bounds 106 of the prior target $T_{kt}$, then target $T_{kt+1}$ is considered as the same target as $T_{kt}$ and given the same target index in block 107. Thereafter, an updated expected confidence boundary is set up about the new point $T_{kt+1}$ in block 109 and program execution is exited. However, if another target file k' for the time increment t+1 is compared to the existing targets in block 100 and found to be outside the initial confidence boundaries thereof, it is identified as a new target $T_{k't+1}$ and enumerated as such in block 102. An additional confidence boundary, illustrated by the dashed lines 108 surrounding the point $T_{k't+1}$ in FIG. 7, may be formed about the new target by the processing block 104 and the program is again exited. The target correlator unit 90 may continue the execution of its program for each centroided target file k in each designated time increment t so that all targets are identified and the information pertaining to the same target is assigned an appropriate index as such.

In accordance with the present invention then, a system 110 for assessing the detected threats k adaptably based on the relative bearing information of each potential threat with respect to the radar is included as part of the radar, as shown in the functional block diagram schematic of FIG. 2, to determine the collision potential of each of the detected threats k with the radar. The signals denoted as $\Sigma_{kt}$ and $\Delta_{kt}$ which are representative of the relative bearing of the detected threat k for each time increment t, may be provided to the threat accessor system 110 over signal lines 112 and 114, respectively. To understand the operation of the system 110 reference may be made to the scenario depicted in FIG. 1 during the following description.

The radar post detection processing of the system 110 accomplishes three key functions. It ascertains the initial approach bearing for each detected potential threat and updates this reference throughout the time increments adaptably in accordance with the relative bearing signal information received from the signal lines 112 and 114. Secondly, it filters the effects of noise or other fluctuations inevitably present on the most recent relative bearing signals 112 and 114 to form a signal representative of the instantaneous relative bearing at the time increment corresponding thereto. Finally, the system 110 measures the amount of fluctuations present in the relative bearing signal information 112 and 114 to derive uncertainty or tolerance bounds about the instantaneous relative bearing estimate.

The collision potential determination of the system 110 comprises comparing, at each of a selected number of time increments, the deviation between the generated reference and instantaneous relative bearing signals with the uncertainty bounds computed at the respectively corresponding time increment. An indication of a non-collision bearing behavior of a detected threat is effected at any time increment during the sequence of time increments of tracking the detected threat in which a deviation between the correspondingly formed reference and instantaneous relative bearing signals exceeds the boundary limits associated therewith.

In the present embodiment, the system 110 utilizes accumulators 116 and a divder unit 118 to generate the reference relative bearing signal over signal line 120 based on a signal weighting function. A new value of the reference signal 120 may be generated for each of a selected number of time increments. The accumulators 116 may perform the additional function of accumulating the number of time increments $n_t$ of operation during a tracking sequence of a target k. A signal representative of the number $n_t$ may be provided over a signal line 122 from accumulators 116. The instantaneous relative bearing signal, which is denoted as $\mu_{kt}$, is generated in a short-term mean calculator 124, in the present embodiment for each of the number of selected time increments. The calculator 124 also uses a signal weighting function operating on a predetermined number of most recently derived relative bearing representative signals 112 and 114 with respect to the corresponding selected time increment.

An arithmetic circuit 126 may also be disposed in the system 110 for computing the uncertainty limits for the instantaneous relative bearing signal at each of the selected time increments. The computation may be based on a function representative of the fluctuations in the varying relative bearing representative signals 112 and 114 generated for the sequence of time increments from threat detection to the corresponding selected time increment, inclusively. Accordingly, in system 110 the aforementioned generated signals may be provided to a collision potential assessor unit 128 which performs the comparison operations and determines the collision potential of the detected threat with the radar at each of the selected number of time increments. A non-collision indication may be rendered over the signal line 130 under the control of the assessor unit 128.

Figure 9:
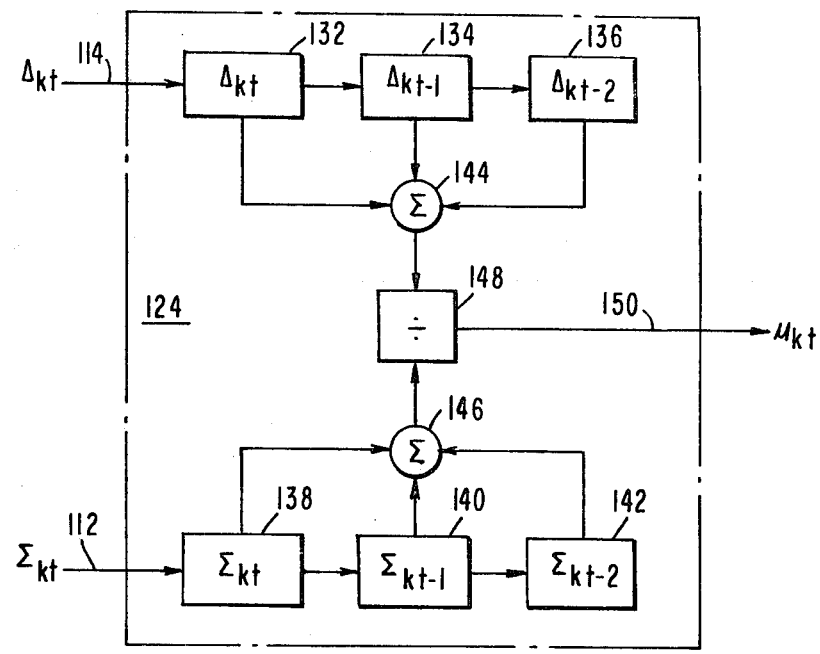
FIG. 9 is a functional block diagram schematic embodiment suitable for use as the short-term mean calculator in the embodiment of FIG. 2.

FIGS. 9, 10 11 and 12 depict functional block diagram scematic embodiments of the various computational blocks suitable for use in the collision threat assessment system 110. For example, the embodiment of FIG. 9 is suitable for use as the short-term mean calculator 124 as depicted in the system block 110 of FIG. 2. Three storage memory units 132, 134 and 136 may be included for storage of the most recent three values of the centroided $\Delta$ signals for a particular potential threat k with respect to a selected time increment t (i.e. $\Delta_{kt}$, $\Delta_{kt-1}$, and $\Delta_{kt-2}$). Similarly, three additional memory storage units 138, 140 and 142 may also be included in the calculator 124 for storing the three most recently centroided $\Sigma$ signals pertaining to the same potential threat k with respect to the same time increment t (i.e. $\Sigma_{kt}$, $\Sigma_{kt-1}$, and $\Sigma_{kt-2}$). At the corresponding time increment t, the signal information stored in each set of memory storage units 132, 134, 136 and 138, 140, 142 may be added by conventional adder units 144 and 146, respectively. The results of the adder unit 144, $$\bar{\Delta}_{kt} = \sum_{i=t-2}^{t} (\Delta_{ki}),$$

is divided by the result of the adder unit 146, $$\bar{\Sigma}_{kt} = \sum_{i=t-2}^{t} (\Sigma_{ki}),$$

in a conventional divider unit 148 to generate the instantaneous relative bearing signal $\mu_{kt}$ for the corresponding time increment t. Accordingly, for each selected time increment, a new set of $\Delta_{ki}$ and $\Sigma_{ki}$ signals may be stored in the appropriate storage memory units, added by the summers 144 and 146 and divided by the divider unit 148 to produce a new instantaneous relative bearing signal $\mu_{kt}$ over signal line 150.

Figure 10:
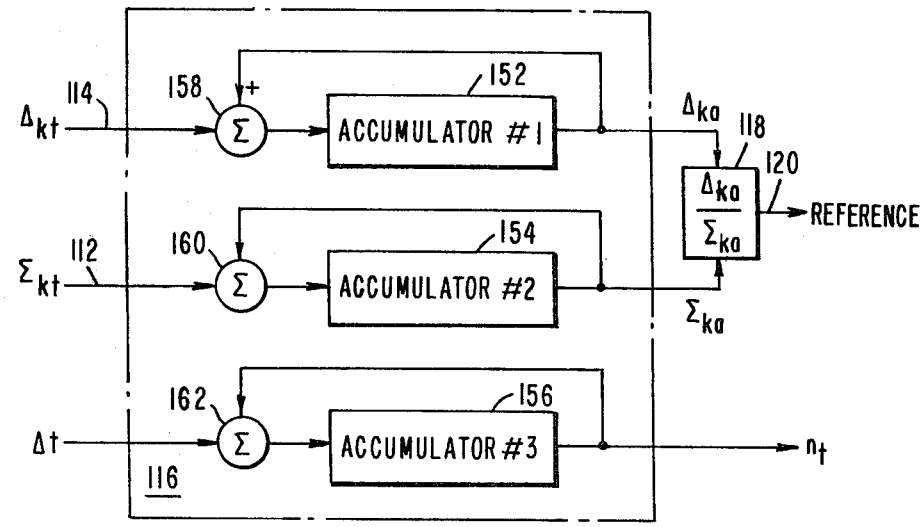
FIG. 10 depicts a functionally suitable block diagram embodiment for deriving the long term mean signal in connection with the assessor system of the monopulse radar depicted in FIG. 2.

The block diagram schematic of FIG. 10 depicts a functionally suitable embodiment for the accumulators 116 of the assessors system 110. The unit 116 may include three accumulators 152, 154, and 156 along with respectively corresponding summer units 158, 160 and 162. The configuration for each summer-accumulator combination is typical for the purposes of accumulating a predetermined number of signals. In the present embodiment, the centroided $\Delta$ and $\Sigma$ signals for the potential threat k are accumulated in the accumulators 152 and 154 for each of the time increments t. The accumulated values $\Delta_{ka}$ and $\Sigma_{ka}$ provided from the accumulators 152 and 154, respectively, may be divided in the divider unit 118 to generate the reference signal over signal line 120 which is representative of th long-term mean of the relative bearing signal. Note that the computations, $$\Sigma_{ka} = \sum_{t=1}^{a} (\Sigma_{kt}) \text{ and } \Delta_{ka} = \sum_{t=1}^{a} (\Delta_{kt}),$$

may be performed for each of a selected number of time increments t which may also be accumulated in the unit 156 utilizing the summer 162 to effect the signal denoted as $n_t$.

Figure 11:
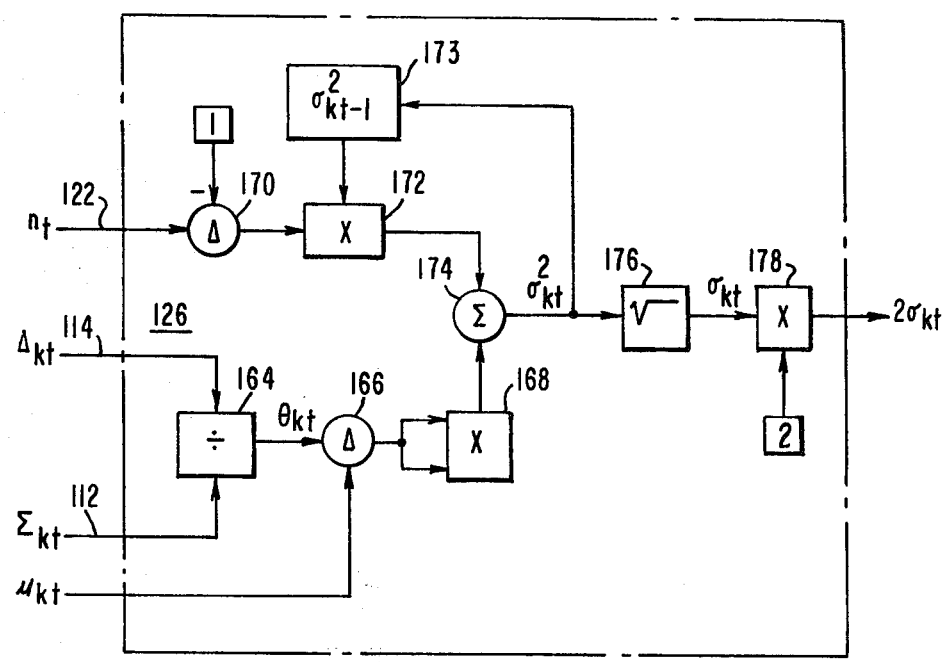
FIG. 11 is a functional schematic block diagram of an arithmetic unit suitable for use in the embodiment of FIG. 2 as the uncertainty limits computer.

FIG. 11 depicts a functional schematic diagram tations deriving the uncertainty limits surrounding the instantaneous relative bearing for each of the selected time increments t. In this embodiment, each of the centroided $\Sigma_{kt}$ and $\Delta_{kt}$ signals 112 and 114 for the detected potential threat k at each time increment t may be divided in the divider unit 164 to produce a signal $\theta_{kt}$ which is representative of the relative bearing of the potential threat k for each of the time increments t. In addition, the difference between the generated signal $\theta_{kt}$ and $\mu_{kt}$ may be generated by a differencing unit 166. The resulting difference from 166 may then be squared with a conventional multiplier unit 168. Concurrently, at each time increment t, the signal $n_t$ representative of the accumulated number of time increments may be decremented by one in the differencing unit 170 and multiplied in another conventional multiplier unit 172 by a signal representative of the variance of the relative bearing signals in the target file k computed for the previous time increment t−1. The previously calculated variance representative signal, denoted as $\sigma_{kt-t}^2$ may be stored in a memory cell 173 for each of the selected time increments. The resulting signals from the multipiers 168 and 172 may be added in a summer unit 174 to generate the variance $\sigma_{kt}^2$ of the relative bearing signals of the potential threat k for the corresponding time increment t. A square root operator unit 176 may be included to form the standard deviation $\sigma_{kt}$ which in turn is multiplied by a predetermined integer in another conventional multiplier unit 178 to yield the desired number of standard deviations for the uncertainty bounds surrounding the instantaneous relative bearing signals $\mu_{kt}$.

In the present embodiment, twice the standard deviation was found to be an adequate uncertainty figure for the majority of conditions. It is understood however that this uncertainty figure may be either reduced or increased to fit the occasion. Furthermore, while the standard deviation of relative bearing signals was used to compute the uncertainty in the instantaneous relative bearing representative signals from time increment to time increment, it is understood by those skilled in the pertinent art that other statistical weighting computations may also be suitable depending upon the desired results.

Figure 12:
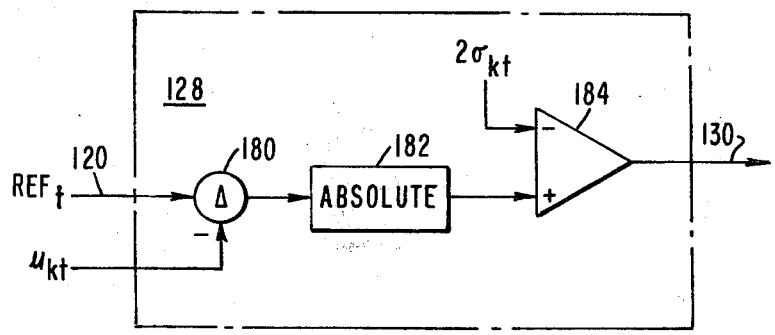
FIG. 12 is a functional block diagram schematic of an embodiment suitable for use as the collision potential assessor in the embodiment of FIG. 2.

FIG. 12 depicts a functional block diagram schematic of an embodiment suitable for use in the assessment system 110 as the collision potential assessor unit 128. Referring to FIG. 12, the reference signal 120 and the instantaneous relative bearing signal $\mu_{kt}$ are supplied to a differencing unit 180 to compute the deviation therebetween for each selected time increment t. In this embodiment, the absolute value of the deviaton is derived by the functional block 182 in a conventional manner and the resulting signal is supplied to one input of a comparator unit 184. The uncertainty boundary related signal denoted as $2\sigma_{kt}$ may be applied to another input of the comparator 184 for the purposes of comparison with the absolute value signal correspondingly generated for each of the time increments t. In those time increments in which the deviation signal exceeds the uncertainty boundary related signals, the comparator unit 184 generates a non-collision assessment signal over signal line 130. It is understood from the description provided above in connection with the scenario depicted in FIG. 1 that should non-collision be assessed prior to the proximity range threshold $r_{th}$, the deployment of countermeasures may be avoided.

Figure 13:
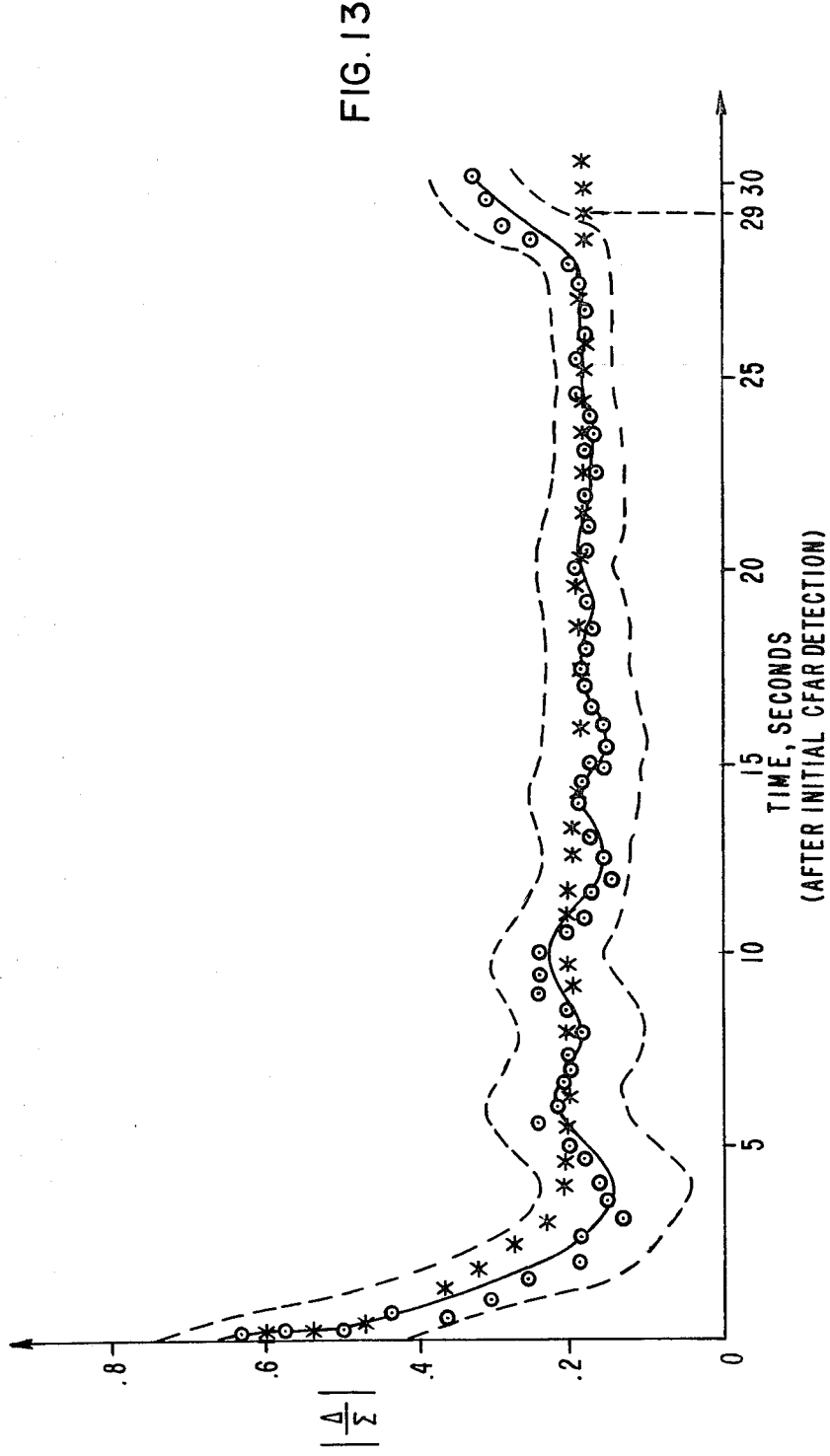
FIG. 13 is a graphical illustration of the principles of operation of the adaptive collision threat assessor described in connection with the embodiment of FIG. 2.

A graphical illustration of the principles of operation of the adaptive collision threat assessor is shown in the graph of FIG. 13. In the graph, the asterisks denote the computed reference or long-term mean of the derived relative bearing representative signals, the straight line represents the instantaneous or short-term mean of the relative bearing representative signals, the ⊙ denotes the relative bearing representative signals generated at each of the selected time increments t and the dashed lines on either side of the short term mean represent the derived uncertainty limits or boundaries with respect to the generated short-term mean. The example used for the graph of FIG. 13 is that of an aircraft target with a 2,000 foot near miss from a relative bearing of 220°.

Referring to FIG. 13, initially, say at time t=0, for example, the monopulse radar relative bearing representative signal (i.e. along the ordinate) is close to unity due to the noise content thereof. As the aircraft, which is the detected potential threat, approaches the radar, the generated reference signals converge toward a steady value (i.e. the reference or long term mean signal becomes very smooth). However, the short-term mean signal continues to fluctuate. One reason for the fluctuation may be because of the relative bearing representative signals passing through range gate centers which is a normal occurrence in the radar range determination operations. This is particularly emphasized by the considerable noise present in the individual relative bearing representative signal data points ⊙ as mapped on the graph of FIG. 13. As the relative bearing of the detected aircraft begins to change rapidly, the generated short-term mean signal deviates further from the reference mean signal. When the deviation exceeds the confidence limits or boundaries, which is reached at t=29 seconds in the present example, the non-collision assessment is effected. In this example, the confidence bounds of $2\sigma$ is considered about 95% confidence that a relative bearing data point lying $2\sigma$ from the reference signal at any selected time increment is not due to noise but, rather, due to a change in the short term mean, i.e., non-collision angular behavior.

One advantage of the present invention is that it may assess collision potential in detected targets solely in measuring the degree to which the detected target maintains a constant relative bearing with respect to the homecraft radar. Another advantage is that the assessor may compute its relative bearing representative signals with nonscanning monopulse radar antennas. Furthermore, the proposed system does not require assumptions regarding the radar data signatures of the detected potential threats (e.g. cross-sectional analysis, range and velocity trajectories, engine side lobe signatures). Moreover, the assessor system is considered self adaptive in obtaining boundary or tolerance values by which to measure deviation from a constant relative bearing with respect to the radar itself.

I claim:

1. A monopulse radar operative to detect at least one potential threat and to track said threat through a sequence of time increments beginning with the detection thereof, wherein the improvement includes a system for assessing said detected threat adaptively in accordance with the relative bearing thereof with respect to said radar to determine the collision potential thereof with said radar, said system comprising:

means for deriving a signal representative of said relative bearing of said detected threat for each time increment to generate a sequence of relative bearing representative signals respectively corresponding to said sequence of time increments;

means for generating a first signal for each of a selected number of time increments based on a signal weighting function of said relative bearing representative signals derived for the sequence of time increments from threat detection to said corresponding selected time increment, inclusively;

means for generating a second signal for each of said selected number of time increments based on a signal weighting function of a predetermined number of most recently derived relative bearing representative signals with respect to said corresponding selected time increment;

means for generating a third signal for each of said selected number of time increments based on a function representative of the fluctuations in the relative bearing representative signals generated for the sequence of time increments from threat detection to said corresponding selected time increments, inclusively; and means for compairing, at each of said selected number of time increments, the deviation between said correspondingly generated first and second signals with said correspondingly generated third signal to determine the collision potential of said detected threat with said radar.

2. The improvement in accordance with claim 1 wherein the first signal generating means includes a means for accumulating the relative bearing representative signals derived for the sequence of time increments associated with each generated first signal to form a long term, signal weighted, mean signal for each of the selected time increments, said each formed mean signal being representative of an adaptively updated initial approach bearing measurement of the detected threat with respect to the radar.

3. The improvement in accordance with claim 1 wherein the second signal generating means inlcudes a means for accumulating the predetermined number of most recently derived relative bearing representative signals associated with each generated second signal to form a short term, signal weighted mean signal for each of the related time increments, each formed mean signal being representative of an adaptively filtered estimte of an instantaneous relative bearing measurement of the detected threat with respect to the radar.

4. The improvement in accordance with claim 1 wherein the third signal generating means includes arithmetic processing means for deriving a standard deviation signal from the generated second signals and correspondingly derived relative bearing representative signals for each of the selected time increments to form a signal representative of the level of confidence of the generated second signal for each of the selected time increments.

5. The improvement in accordance with claim 1 wherein the comparing means including means for detecting an event comprising a deviation between corresponding first and second signals which is greater than the value of the corresponding third signal, said event being indicative of a non-collision bearing behavior of the detected threat.

6. A monopulse radar operative to detect at least one potential threat and to track said threat through a sequence of time increments beginning with the detection thereof, wherein the improvement includes a system for assessing said at least one detected threat adaptively in accordance with the relative bearing thereof with respect to said radar to determine the collision potential thereof with said radar, said system comprising:

means for deriving a signal representative of said relative bearing of said detected threat for each time increment of said sequence;

first means for accumulating the relative bearing representative signals derived for the sequence of time increments from threat detection to each of a selected number of time increments to form a long term, signal weighted, mean signal for each of said selected time increments, each formed long-term mean signal being representative of an adaptively updated initial approach bearing measurement of the detected threat with respect to said radar;

second means for accumulating a predetermined number of most recently derived relative bearing representative signals with respect to each selected time increment to form a short term, signal weighted, mean signal for each of said selected time increments, each formed short-term mean signal being representative of an adaptively filtered estimate of an instantaneous relative bearing measurement of the detected threat with respect to said radar;

arithmetic processing means for deriving a standard deviation signal from said short term mean signals and correspondingly derived relative bearing representative signals for each of said selected time increments, said standard deviation signal being representative of an adaptively updated level of confidence corresponding to each form short-term mean signal; and comparing means operative at each of said selected time increments to detect an event comprising a deviation between said correspondingly formed long and short-term mean signals which is greater than said correspondingly derived standard deviation signal, said event being indicative of a non-collision bearing behavior of said detected threat.

7. The improvement in accordance with claim 6 wherein the monopulse radar includes means for generating centroided sum and difference signals for each detected potential threat k for each time increment t of the sequence, said centroided sum and difference signals being denoted as:

$\Sigma_{kt}$ and $\Delta_{kt}$, respectively.

8. The improvement in accordance with claim 7 wherein the first means includes: means for accumulating the centroided sum and difference signals, separately, for each time increment a in accordance with the following equations:

$$\Sigma_{ka} = \sum_{t=1}^{a} (\Sigma_{kt}) \text{ and } \Delta_{ka} = \sum_{t=1}^{a} (\Delta_{kt})$$

where $\Sigma_{ka}$ and $\Delta_{ka}$ represent accumulated values of the centroided sum and difference signals, respectively, for each time increment a of the sequence; and means for generating each long term mean signal by dividing each accumulated value $\Delta_{ka}$ with said accumulated value $\Sigma_{ka}$ for each time increment a of the sequence.

9. The improvement in accordance with claim 7 wherein the second means includes: means for accumulating the three most recently generated centroided sum and difference signals, separately, with respect to the corresponding time increment t in accordance with the following formulas:

$$\overline{\Sigma}_{kt} = \sum_{i=t-2}^{t} (\Sigma_{ki}), \text{ and}$$

$$\overline{\Delta}_{kt} = \sum_{i=t-2}^{t} (\Delta_{ki}),$$

respectively, where $\Sigma_{ki}$ and $\Delta_{ki}$ represent generated centroided sum and difference signals for time increment i, and t−2, t−1 and t represent the three most recent time increments with respect to the corresponding time increment t; and means for generating the short-term mean signal by dividing the accumulated difference signal $\overline{\Delta}_{kt}$ by the accumulated sum signal $\overline{\Sigma}_{kt}$ for each time increment t in the sequence.

* * * * *